United States Patent Office 2,884,413
Patented Apr. 28, 1959

2,884,413

ORTHOPHOSPHATE ESTERS OF STARCH

Ralph W. Kerr, Riverside, and Frank C. Cleveland, Jr., Chicago, Ill., assignors to Corn Products Company, a corporation of New Jersey No Drawing. Application April 6, 1956
Serial No. 576,524

15 Claims. (Cl. 260—233.5)

This invention relates to the preparation of starch phosphate esters, including simple and cross-linked phosphate esters. The term "starch phosphate ester," as used herein, means the ester of starch and orthophosphoric acid or any salt or acid salt thereof.

Starch phosphate esters appear to have very desirable properties for certain uses, particularly in the food field. However, until now there has been no simple and economical method available for their preparation.

It is an object of the present invention to provide a new and novel process for the production of simple starch phosphate esters. A further object is to provide a method of cross-linking simple starch phosphate esters. Other objects will appear hereinafter.

We have discovered that when starch in semi-dry state is heated under certain conditions in contact with an inorganic phosphate salt from the group consisting of metaphosphates, polymetaphosphates, pyrophosphates, tripolyphosphates, and mixtures thereof, the starch reacts with the phosphate to form a partial ester (simple ester), or the salt of a partial ester of the starch and orthophosphoric acid. Optionally, the starch ester may be cross-linked by continuing the heat treatment in the presence of certain alkaline substances.

We are aware that it has been proposed heretofore to use inorganic phosphates as starch modifying agents and to prepare starch phosphate esters. Patents directed to the use of such materials are as follows: German 644,027, issued July 7, 1934, and U.S. 2,252,479, issued August 12, 1951. The German patent claims that certain inorganic phosphates exert a lyotropic effect on cold swelling starch but there is no evidence of starch esters being formed, particularly since the salts are merely added as adjuncts or plasticizers to reduce the viscosity of the cold swelling starch.

The United States patent discloses a method whereby, it is claimed, the sodium salt of starch polymetaphosphoric acid ester is made. However, since the conditions are so highly acidic, it is doubtful, according to our experience, if any starch phosphate ester could be formed, and it is more likely that the starch was degraded to a soluble form by acid hydrolysis. Under conditions less acidic than those disclosed in the patent, tests showed that no ester was formed. However, even assuming that a starch polymetaphosphate ester was formed, the present invention contemplates marked and substantial departures from practices heretofore known, as will appear more fully from the following description.

There appears to be three types of reactions between starch and the phosphate salts specified. The first, such as may take place when tripolyphosphate is used under neutral to slightly alkaline conditions, may be considered analogous in some respects to esterifications using an organic acid anhydride, such as acetic anhydride. Thus, just as this condensed or polyacetic acid is presumed to react in an exchange with starch (ROH)

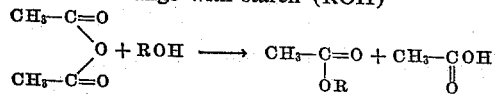

to give an acetic acid ester of starch and a molecule of acetic acid, so tripolyphosphate, for example, may react also in an exchange reaction involving one or more of the anhydro-phosphoric acid residues of the tripolyphosphate to form the orthophosphate ester of starch and leaving the corresponding acid:

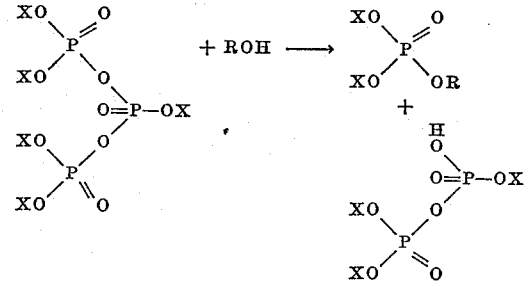

X represents H or monovalent metal

Starch may then conceivably react again in similar fashion with the acid dimer salt to give another starch orthophosphate ester group and a molecule of orthophosphate. In support of this theory, it has been noted that when sodium tripolyphosphate is heated with unbuffered starch, the pH value of the reaction mixture drops progressively from about 8.5 to 9, to values less than 7. In further support of this interpretation, electrometric titration of the polyphosphate with acid and alkali gives two inflection points when plotted graphically against pH, one at pH 3.5 and the other at pH 9.75, whereas the mono-starch phosphate and the by-product phosphate salts, both give two inflections, or "neutralization" points identical to those of orthophosphate which are pH 4.0 and pH 9.2, using procedures given hereinafter. The latter result is convincing proof that the starch product formed according to procedures hereinafter described is a mono-starch orthophosphate ester.

The second type of reaction may be simply an addition reaction, similar to the addition of HOH to metaphosphate to form orthophosphate. With starch and sodium metaphosphate this would be:

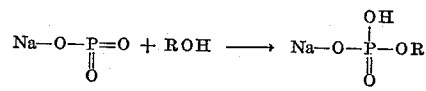

The third type of reaction, which when desired, may be induced to proceed prior to, simultaneous with, or subsequent to the first two reactions and may be considered as an extension of these first two reactions although preferably it is induced by adding an alkaline metaphosphate. This reaction leads to the production of di-starch orthophosphate in which the orthophosphate ester group establishes a cross-link between starch molecules. The reaction is illustrated using sodium trimetaphosphate:

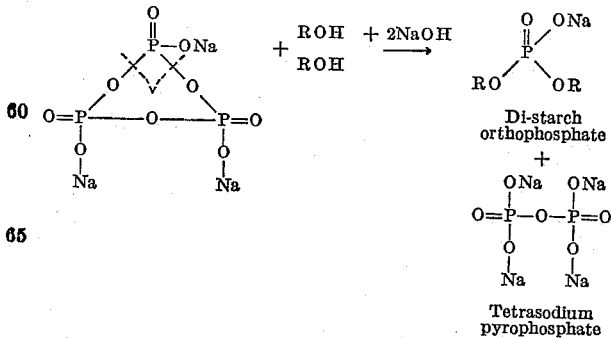

In carrying out our invention, the phosphate salt reagent is first added to starch. This addition may be effected in several ways. The simplest and one of the most effective ways is to add the phosphate to an aqueous starch slurry, at room temperature, and, when it is desired to produce a starch phosphate ester in granule form at a temperature insufficient to effect gelatinization of the starch, stir the slurry well and filter the same. If a phosphate salt is added to a starch slurry having a density between 17° Bé. and 22° Bé., which range has been found to cover practical operating conditions, the amount of such salt retained by the starch after filtration is about 10 to 75 percent of the salt originally added, depending upon conditions of addition and amount of washing. The filtrate, obtained from one such filtering operation and with appropriate additions of phosphate salt reagent to compensate for the amount retained by the filtered starch, may be used advantageously for starch to be treated subsequently.

Alternately, the slurry of starch in an aqueous solution of the phosphate reagent may be spray-dried or roll-dried, in which case all of the phosphate reagent added is incorporated with the starch. The starch may, or may not, be gelatinized during the spray-drying operation but is generally gelatinized by roll-drying. In fact, any desired method may be used for admixing the phosphate salt reagent and starch which tends to insure that the salt will be evenly distributed throughout the starch.

The amount of phosphate salt reagent admixed with the starch during the heat treatment to be described subsequently may vary from about 0.5 to about 10 percent calculated on the anhydrous salt, based on the dry weight of the starch, and the pH of the mixture, as measured on a 20 percent aqueous dispersion of the mixture using a glass electrode, should be between 4 and 11.5, depending on the particular type of phosphate reagent employed and which of the three above described reactions is to be promoted. Use of pH levels less than about 4 promotes hydrolysis of the starch or starch product which is undesirable for many applications; use of pH levels higher than 11.5 makes possible alkaline degradation of the starch, hydrolysis of the meta- or polyphosphate and other side reactions all of which result in poor phosphorylation efficiency.

The second step of carrying out the present invention is to adjust the moisture content of the starch to 20 percent or below, a practical range being about 5 to about 20 percent, if, for example, the slurry method, which is the preferred method, has been used to admix the starch and phosphate salt. If it is desired to keep starch in granule form during the entire treatment, the starch-phosphate salt mixture may be dried satisfactorily in typical starch driers, e.g., those wherein heated air is forced through the drier. A drier of the continuous belt type sold by Proctor and Schwartz Company is satisfactory. Air temperatures of from 120° F. to 255° F., for example, are satisfactory in drying starch without gelatinizing it in this type of starch drying equipment. The temperature of the starch phosphate mixture during such drying should not exceed about 60° C. to 70° C. until the moisture content has been reduced to about 20 percent in order to insure the greatest beneficial effect from the added phosphate reagent in the production of mono-starch orthophosphate, and particularly if the starch granule form is to be preserved. It has been found that higher temperatures at higher moisture levels under such conditions of drying induce an undue amount of hydrolysis of the phosphate reagent and other undesirable side reactions involving the starch itself due to the long time of contact. However, when the drying is effected on heated rolls or by spray drying, the initial moisture content may exceed 20 percent since the removal of moisture is instantaneous, as will be explained more fully hereinafter.

The next step in the process of our invention is the heat treatment. This should be carried out at about 100° C. to about 160° C., i.e., the temperature of the starch-phosphate salt mixture should be within this range to effect the desired reaction. Temperatures lower than 100° C. would produce virtually no phosphorylation if indeed such a reaction does occur at all at these lower temperatures. Temperatures substantially above 160° C. are difficult to control and the products may become discolored and degraded, making them less suitable for many applications, although such temperatures may be used if the time is extremely short and care is exercised in handling the product. The preferred range is 120° C. to 140° C. The time will depend upon the type of product desired. The solubility of the simple ester increases as the time, temperature, and amount of phosphate reagent increase and is greatest when all three are at their maximum. The degree of cross-linking, when this reaction is to be promoted, also increases as the time, temperature, and amount of phosphate reagent increase, but is primarily influenced by pH control appropriate to the type of phosphate reagent employed. Under some conditions, cross-linking may reach the point where the starch cannot be gelatinized. It is not practical to set forth the exact time, temperature and amount of salt for each product possible of production. However, with the aid of the information set forth in the examples which follow and suitable preliminary tests, such as gelatinization characteristics, paste viscosity, paste clarity, and the results of electrometric titration, those skilled in the art will be able to select conditions suitable to produce the product they desire.

The heat treatment of the starch-phosphate salt mixture at the temperature specified should be carried out in equipment which provides for removal of moisture. For example, one may employ a vacuum oven, infra-red heating of the material on a moving belt, etc.

It is also possible to effect the heat treatment on heated rolls or in a spray drier. In such cases, it is possible to effect gelatinization, drying and phosphorylation in one treatment provided the aforementioned conditions of pH and temperature are observed. Either a starch slurry or paste containing the phosphate may be roll or spray-dried. The moisture is reduced instantaneously by such methods to within the range heretofore specified and the phosphorylation reaction then can take place instantaneously also. In cases where roll or spray-drying of the material has been carried out at temperatures below those specified, it is possible to obtain the desired phosphorylation by subjecting the dried material to heat treatment at the proper temperatures.

After the heat treatment, the starch ester may be washed in appropriate solvents to effect purification and dried in conventional manner.

The process is applicable to any starch (corn (maize), wheat, grain sorghum, etc.) in raw or modified or derivatized form, in gelatinized or granule state. For example, in addition to raw starch, thin boiling starches, dextrins, derivatives of starch such as ethers and esters other than phosphate esters may be treated in accordance with the principles of our invention. The ethers and esters must contain at least one free hydroxyl group. The term "starch product," as used hereafter, is intended to include all of the aforementioned products.

The pH, as already mentioned, may vary from about 4 to about 11.5. At lower pH values the simple monostarch phosphate esters are formed almost exclusively while at the higher pH values the cross-linked esters are formed. For example, at pH about 4 to 5 metaphosphates form substantially only simple esters. Above these pH values a very definitely larger proportion of di-starch phosphate (cross-linked esters) is formed. The pH values for the formation of simple esters when polymetaphosphates, pyrophosphates and tripolyphosphates are used are preferably from about 7 to 9, whereas from about 9 to 11.5, the cross-linked esters are formed to a very much larger extent. The degree of cross-linking increases with increase of pH. The pH may be increased by the addition of alkaline substances, such as sodium carbonate, sodium bicarbonate, sodium orthophosphate and sodium hydroxide, or other bases.

The end products of this invention will have a degree of substitution (D.S.) preferably up to 0.1 orthophosphate group per anhydroglucose unit, although obviously the degree of substitution (D.S.) may be increased substantially above this level by an extension of the procedures hereinafter described, and will be water soluble or insoluble depending upon the degree of phosphorylation and the manner of treatment. They have improved properties in respect of paste clarity, significantly higher hot paste viscosity and a marked reduction in the tendency of cold paste body to increase with age ("set-back") and their pastes or sols have "long" flow as compared with properties of the starches from which they were derived.

Thus, for example, corn starch and certain products derived therefrom form cloudy or opaque and relatively short bodied pastes when dispersed or gelatinized in water and form typical, non-reversible gels at higher concentrations on standing. However, when corn starch is partially esterified so as to contain as little as 0.03 simple mono-starch phosphate group per anhydroglucose unit (D.S.=0.03) the colloidal properties of the gelatinized starch ester are so profoundly altered as a result of esterification that the product now resembles a potato starch sol (to which it is now closely related in chemical structure by virtue of phosphate ester groups) and other non-cereal starches as well as the waxy starches. Thus the altered characteristics permit the use of the corn starch ester for such applications as the thickening of food products, such as soups, canned vegetables and fruits where a thick bodied, creamy, relatively clear thickening agent is preferable instead of an opaque, gel-like consistency which is obtained with corn and many other cereal starches.

Other well known applications wherein the characteristics of potato starch, other non-cereal starches and the waxy starches make them preferable to corn starch and wherein mono-starch orthophosphate may be used to equal or better advantage than potato starch are certain sizing operations in paper and textile manufacture, more particularly, sizing paper pulp at or subsequent to the beaters, resulting in a stronger sheet than is obtained with previously known starches, and the finishing of cotton, woolen and certain synthetic fiber fabrics.

When, and if, a relatively small number of di-starch phosphate cross-links are produced in the mono-starch phosphate ester either prior to, simultaneously with, or subsequent to production of the latter, then although in certain applications clarity of paste and freedom of set-back is preserved, the cross-linked, starch phosphate forms a relatively very thick, but very much less cohesive paste. Moreover, the cross-linked product forms pastes or sols with viscosity and body which are very much more stable to the effect of such agents or conditions as high temperature and pressure, shearing action, acidity, alkalinity or added soluble materials, such as sugars. In these improved characteristics, the mono-starch phosphate esters which are additionally cross-linked with a minor proportion of di-starch phosphate cross-links equal or excel the characteristics of waxy or non-cereal starches which are cross-linked by orthodox procedures such as by treatment with epichlorohydrin or by aldehydes. These partially cross-linked starch phosphates are accordingly particularly useful in applications where the starch pastes are subjected to destructive influences, such as, for example, to sugar and citric acid at high temperatures in gum drop candy manufacture, to sugar, acetic acid and heat in salad dressing manufacture, to sugar, fruit acids and temperatures in the production of fruit pie fillings, particularly canned, cooked berry pie fillings as well as many other analogous operations.

From the foregoing it will now be apparent that a wide variety of products may be made for a large number of applications and that the number of mono-starch phosphate groups introduced as well as the proportion of di-starch phosphate cross-links may vary with the application. Thus, for example, for the thickening of cream style corn, substantially no cross-links may be desired, whereas for the making of cherry pies some cross-links are desirable and for the production of canned cherry pie fillings which may be subjected to autoclave pressures and temperatures a larger proportion of cross-links are desirable.

Before description of the specific examples analytical procedures and method for comparison will be described.

Phosphorus was determined by an adaptation of the method described by Howk and De Turk, Ind. Eng. Chem., Anal. Ed., 4, 111 (1932). All products were first extensively washed either in aqueous alcohol, or in the case of water insoluble product, in distilled water prior to analysis. In several instances samples of the starch products of the examples subsequently given were additionally purified by dialysis against distilled water with no significant change in phosphorus content.

Clarity of paste was determined by gelatinizing one percent by weight of starch in water at pH 6.5 in a boiling water bath for 30 minutes after the paste temperature reached 90° C., cooling to 25° C. for one hour and measuring the percent light transmission at $\lambda$—650 m$\mu$ in a Coleman spectrophotometer, Model 14.

Scott viscosity values were determined on hot pastes at pH 6.5 essentially as described by Kerr, "Chemistry and Industry of Starch," 2nd edition, Academic Press, Inc., New York (1950), pages 119 to 121. Because of the relatively high viscosity of some of the phosphate esters made from otherwise unmodified starch, a concentration of 5 grams, dry basis, in 280 ml. of water was used and the viscosity was reported as seconds for delivery of 50 ml. of the paste. Scott viscosity on the phosphate esters of acid modified starch (Table II) were determined at a concentration of 28.35 grams (at 12 percent moisture) in 280 ml. of water and viscosity was reported in seconds for delivery of 100 ml.

Stormer cold paste body, or consistency, was determined essentially as described by Kerr, "Chemistry and Industry of Starch," pages 123 and 124. Concentration of starch was varied from 5 to 15 grams per 280 ml. of water (as noted in Tables I and II) depending on the paste body and results were expressed as seconds per 100 revolutions.

The electrometric titration hereinabove referred to was run on 20 percent dispersions of the purified starch product in water into which was immersed the glass and secondary electrodes of a Beckman pH meter. The pH was first adjusted to a value slightly less than 2.0 with hydrochloric acid and then with stirring 0.1 N sodium hydroxide was added in small portions and the resulting pH noted. Finally, observed pH values were plotted against amounts of alkali added.

The following are examples of the application of the invention to practice. These specific examples are to be regarded as merely informative and typical and not as limiting the invention in any way.

EXAMPLE 1

*Reaction of corn starch with sodium metaphosphate at neutral pH*

Fifty-eight grams of commercial grade sodium metaphosphate was dissolved in 500 ml. of water. Then, one molar weight of corn starch (180 grams at 10 percent moisture) was stirred in. The pH of this mixture was adjusted to approximately 7 with NaOH. After 15 minutes, the starch was filtered by suction and the cake was air dried to approximately 12 pecent moisture content. By analysis, it was found that 9 grams of sodium metaphosphate (0.09 mole) had been taken up by the starch, the balance being in the aqueous filtrate.

The starch was heated for one hour at 120° C. in a vacuum oven and then cooled. The product was washed three times by suspension in 250 ml. of water followed by filtration by suction. The pH of the first suspension was 5.4, indicating that phosphorylation took place between pH 7 and 5.4. The pH of the third wash was 6.0. The washed product was dried for analysis with results as shown in Table I. These results indicate a phosphorus content of 0.35 percent equivalent to a D.S. of 0.03 as orthophosphate groups. When this starch phosphate was gelatinized by heating in water a paste was formed of very much greater viscosity (as indicated by Scott viscosity value) and body (as indicated by Stormer consistency values) which did not increase materially with age and with greatly improved clarity as compared with the untreated corn starch. Pastes showed no tendency to gel with age.

Comparing the characteristics of this product, such as percent phosphorus, clarity and viscosity of paste, with characteristics of products described in the following examples, particularly Examples 3 and 4, it is obvious that a portion of the phosphate groups introduced into the starch were di-starch phosphate cross-linkages. The initial phases of the phosphate cross-linking reaction produces an abnormally higher viscosity and a smaller increase in paste clarity for any given percentage of phosphorus introduced into the starch than does simple esterification.

EXAMPLE 2

*Reaction of corn starch with sodium metaphosphate and added sodium carbonate*

This example illustrates how cross-linking may be obtained to an extent that the product can not be gelatinized in water. The procedure outlined in the preceding example (Example 1) was repeated with the exception that approximately 12.5 grams of a 4:1 mixture of sodium bicarbonate and sodium carbonate was added to the slurry of starch in the metaphosphate solution prior to the first filtration step. The pH of this mixture was 8.5. Analysis of the washed product, as shown in Table I, indicates that it contained 0.7 percent phosphorus.

When 5 grams of this starch phosphate was heated in 100 ml. of water at 95° C. for 20 minutes, the granules failed to gelatinize and settled from suspension when the cooked mixture was allowed to stand, indicating that the starch was highly cross-bonded with phosphate groups.

EXAMPLE 3

*Reaction of corn starch with sodium metaphosphate under acidic conditions*

The procedure outlined in Examples 1 and 2 were repeated with the exception that nothing was added to the mixture of corn starch and sodium metaphosphate in water. The pH of the starch slurry before filtration was 4.0.

After the dried starch cake had been heated for one hour at 120° C. it was thoroughly washed in water, at the same time the pH of the product being adjusting to 6.5 with dilute sodium hydroxide. The pH of the first aqueous suspension of the heated product was 4.1.

Characteristics of this product are shown in Table I. Pastes made from this starch phosphate were "long" in flow characteristics and of very high clarity. These properties, together with the lower paste viscosity of this product compared with the product of Example 1, indicate that there was much less cross-linking in the product of this example, than in the product of Example 1, and, of course, very considerably less cross-linking than in the product of Example 2.

These first three examples indicate that at lower pH values metaphosphate reacts with starch to form simple phosphate ester groups with little or no phosphate cross-linkages between starch molecules, but as the pH of reaction is raised, cross-linking becomes more pronounced.

TABLE I.—PROPERTIES OF STARCH PRODUCTS MADE IN EXAMPLES 1 TO 8 AND 10 TO 12

| Product | Reagent | Amt. Reagent per Molar Wt. Starch, g. | Reaction Time at 120° C., hrs. | D.S. as Orthophosphate Groups | Clarity as percent L.T. | Scott Viscosity, 5 g./ 280 ml., sec. per 50 ml. | Stormer Consistency Tests, 5 g. Product in 280 ml. H₂O, 75 g. wt. sec./100 Revolutions | |
|---|---|---|---|---|---|---|---|---|
| | | | | | | | 1 hr. at 25° C. | 24 hrs. at 25° C. |
| Example 1 | Metaphosphate (pH 7) | 9 | 1 | 0.03 | 59 | 121 | b 102 | b 67 |
| Example 2 | Metaphosphate (Carbonate pH 8.5) | 9 | 1 | .06 | | | | |
| Example 3 | Metaphosphate (pH 4) | 11 | 1 | .03 | 86 | 15 | 34 | 33 |
| Example 4 | Tripolyphosphate | 9 | 1 | .03 | 74 | 30 | 214 | 232 |
| Example 5 | do | 10 | 2 | .04 | 78 | 45 | b 52 | b 26 |
| Example 6 | do | 5 | 2 | .03 | 65 | 21 | 62 | 49 |
| Example 7 | do | 3 | 2 | .02 | 58 | 21 | 72 | 53 |
| Example 8 a | do | 8 | 1 | .04 | 77 | 28 | 122 | 130 |
| Example 10 | Hexametaphosphate | 7 | 1 | .03 | 60 | 21 | 57.3 | 57.3 |
| Example 11 | Pyrophosphate | 5 | 1 | .015 | 61 | 17 | 58.0 | 57.3 |
| Example 12 | {Tripolyphosphate, Metaphosphate} | 9, 5 | 1 | .05 | 76 | 570 | b 590 | b 540 |
| Corn Starch | None | | | | 25 | 11 | c 34 | c 220 |
| Grain Sorghum | do | | | | 35 | 11 | c 126 | c 422 |
| Potato Starch | do | | | | 85 | 61 | 142 | 129 |
| Do | do | | | | 90 | 24 | 50 | 48 | a Grain sorghum starch used; in all other examples, used corn starch.
b 175 g. wt.
c Used double the concentration of unmodified corn and grain sorghum starches because using 5 grams in 280 ml. of water, Stormer values were about 10 secs. or very nearly that of water.

EXAMPLE 4

*Reaction of corn starch with sodium tripolyphosphate for one hour at 120–130° C.*

One molar weight of corn starch (180 grams at 10 percent moisture) was stirred into 215 ml. of water into which had been dissolved 15.5 grams of sodium tripolyphosphate. The pH was approximately 8.5. The starch was filtered by suction to form a cake of approximately 45 percent moisture content. This was dried at 60° C. to approximately 12 percent moisture content. By analysis, 9 grams of the polyphosphate (0.08 mole calculated as a sodium monophosphate) was retained by the starch, the balance being in the aqueous filtrate.

This starch was now heated with stirring, and with provision for moisture removal, at temperatures between 120 and 130° C. and then cooled. The starch product suspended in 250 ml. of water, now showed a pH of 7.0. It was filtered and washed twice more by suspension in 250 ml. of water followed by filtration with suction. The starch was then dried to a commercial moisture content of approximately 10 percent for a powdered starch.

Analytical values shown in Table I indicate that the product contained 0.37 percent phosphorus, equivalent to a starch phosphate ester with a D.S. of 0.03 as orthophosphate groups. The starch when gelatinized by heating in water formed a very viscous sol (as indicated by Scott viscosity value) with little or no tendency to gel or increase in viscosity with age (as indicated by Stormer consistency values). The sol had very high clarity compared with untreated corn starch (both measured at pH 6.5) and had "long" flow characteristics similar to tuber or waxy starches.

EXAMPLE 5

*Reaction of corn starch with sodium tripolyphosphate for two hours at 120° C.*

The procedure essentially as described in the previous example (Example 4) was repeated with the exception that the heating period at 120° C. was extended to 2 hours.

The characteristics of the purified product as shown in the table indicate that phosphorylation was increased so that the starch product contained 0.47 percent P (equivalent to D.S. 0.04 as orthophosphate groups). This resulted in a product which when gelatinized by heating in water gave a sol of higher viscosity, higher clarity and heavier body when cold than the product of the preceding example. The colloidal properties of this product compared favorably with those of two randomly selected commercial potato starch samples, as shown in Table I.

EXAMPLES 6 AND 7

*Reaction of corn starch with different amounts of sodium tripolyphosphate at 120° C.*

The procedures given in Example 5 were repeated essentially as described with the exception that preliminary conditions were so adjusted that lesser amounts of sodium tripolyphosphate were taken up by starch for reaction in the dry state at 120° C. for 2 hours.

In Example 6, a molar weight of starch took up 5 grams of the polyphosphate, and in Example 7, 3 grams. As shown in Table I, the finished products formed pastes with progessively less clarity, less viscosity and body than corn starch which had been similarly treated with 9 grams of the salt.

EXAMPLE 8

*Reaction of grain sorghum starch with sodium tripolyphosphate*

The procedure given in Example 4 was repeated with the exception that grain sorghum starch was used instead of corn starch. After one hour reaction period at 120° C., the washed product had a phosphorus content of 0.44 percent equivalent to a D.S. of 0.04 as orthophosphate groups, as shown in Table I. This starch phosphate ester formed a sol with exceptionally high clarity and high viscosity and which showed practically no tendency to retrograde or to set to an irreversible gel on standing. The flow of this paste was long and stringy resembling pastes of the tuber and waxy starches.

EXAMPLE 9

*Reaction of acid-modified, thin boiling corn starch with sodium tripolyphosphate*

An acid-modified, thin boiling corn starch (having an alkali fluidity of 50 and a 28.35 grams Scott test approximately 40 seconds per 100 ml.) was treated with sodium tripolyphosphate in a variety of ways. The object was to show not only that it is feasible to phosphorylate a modified starch product by our process in order to improve its colloidal properties but also to show:

(1) That the amount of modification in properties is dependent on the amount of sodium tripolyphosphate used, other conditions being the same.

(2) And that simply adding the tripolyphosphate to the starch in an aqueous slurry does not materially improve the colloidal properties of the starch. That is, the polyphosphate does not act as a plasticizer or dispersing agent or other type of adjunct sufficiently to modify the paste properties, per se, but rather the decided improvement which results in paste properties when starch is treated with tripolyphosphate in our process is the result of an esterification reaction and the creation of a starch phosphate, as claimed, such as takes place almost entirely in the dry-heating phase of our process.

(A) Approximately 30 grams of sodium tripolyphosphate was dissolved in 400 ml. of water to which was added with stirring 180 grams of a commercial 50-fluidity grade of corn starch at 10 percent moisture content. The starch was filtered, the cake was airdried to approximately 12 percent moisture content and then the starch was heated for one hour at 120° C. It was found that the starch had taken up approximately 6 grams of the tripolyphosphate. The starch product was triple washed with water and dried to 10 percent moisture content as detailed in Example 1.

(B) The experiment was repeated using only 15 grams of the tripolyphosphate to 180 grams starch in aqueous suspension.

(C) The experiment was repeated using only 7.5 grams of the tripolyphosphate to 180 grams of starch in aqueous suspension.

(D) Part A was repeated in every detail except the heating period at 120° C. was omitted.

The characteristics of the treated starch products are compared with those of the untreated, 50-fluidity corn starch in Table II below:

TABLE II.—CHARACTERISTICS OF TREATED AND UNTREATED 50-FLUIDITY CORN STARCH

| Product | Sodium Tripoly-phosphate Retained per 180 g. of Starch, g. | D.S. as Ortho-phos-phate Groups | Paste Clarity as percent L.T. | Scott Vis., 28.35 g./280 ml. sec. per 100 ml. | Stormer Consistency, 15 g./280 ml. conc. and using 75 g. wt; sec./100 Revolutions | |
|---|---|---|---|---|---|---|
| | | | | | 1 hr. at 25° C. | 24 hrs. at 25° C. |
| A | 6 | 0.031 | 88 | 43 | 34 | 31 |
| B | 3 | 0.019 | 83 | 42 | 30 | 80 |
| C | 1.5 | 0.016 | 82 | 40 | 32 | 94 |
| D (not heated) | 6 | | 61 | 41 | 35 | 214 |
| 50-F Starch, untreated | | | 58 | 40 | 43 | 178 |

From these results it will be seen that the properties of a premodified starch, such as clarity of paste and consistency stability on standing, are improved in the same manner as a native starch is improved by phosphorylation. It will also be observed that the extent of improvement depends on the amount of tripolyphosphate added to the starch before the reaction period. It will be noted further that simply treating starch with sodium tripolyphosphate in aqueous solution, without providing more optimal conditions for phosphorylation to take place does not materially alter the characteristics of the starch.

EXAMPLE 10

*Reaction of corn starch with sodium hexametaphosphate*

One molar weight of corn starch was stirred into 215 ml. of water containing 12.8 grams of sodium hexametaphosphate. The pH was 7.4. The starch was filtered by suction and air-dried. By analysis it was found that the starch had taken up approximately 7 grams of the phosphate (0.07 mole as sodium metaphosphate).

The air-dried starch was heated for one hour whereupon it was cooled and washed three times by suspension in 250 ml. water and filtering by suction. The final pH was 6.7.

Data on this product set forth in Table I show that a starch phosphate ester formed with a D.S. of 0.03 as orthophosphate groups and that the ester formed a sol in water which had higher viscosity and clarity than untreated corn starch and no tendency to set up to a gel on standing.

EXAMPLE 11

*Reaction of corn starch with tetrasodium pyrophosphate*

The procedure given in Example 10 was repeated, using tetrasodium pyrophosphate instead of sodium hexametaphosphate and dissolving 10 grams of the salt in the water used to slurry the starch. The pH of this phosphate-starch slurry was 8.5. Approximately 5 grams of the phosphate was taken up by the molar weight of starch. The purified final product had a phosphorus content of 0.18 percent equivalent to a D.S. of 0.015 as orthophosphate groups. As shown in Table I, this product formed a sol when heated with water which had somewhat higher viscosity and clarity than untreated corn starch. Pastes made from the starch showed no tendency to thicken on standing.

EXAMPLE 12

*Reaction of corn starch with a combination of sodium tripolyphosphate and sodium metaphosphate*

The following example is given to illustrate how both cross-linking and simple phosphorylation may be simultaneously controlled by use of a combination of different phosphates. In this example sodium tripolyphosphate at pH 7.9 was used to effect substantially simple mono-starch phosphate production and a lesser addition of metaphosphate was added which at this pH produces substantially only distarch phosphate cross-linkages.

The procedures given in Example 4, using tripolyphosphate and corn starch, were repeated essentially as described with the exception that sufficient commercial sodium metaphosphate was added to the aqueous starch slurry so that the filtered starch cake took up 5 grams of the sodium metaphosphate as well as 9 grams of sodium tripolyphosphate per 162 grams, dry basis corn starch. The pH of the final slurry was 7.9.

After drying the filtered starch cake to approximately 10 percent moisture content, it was heated for one hour at 120° C., cooled and suspended in water (162 g. in 265 ml.). The pH was 6.5. The starch product was filtered, washed twice more by suspension in water and filtering, and then air-dried to a moisture content of 10 percent.

Analytical results on the purified product, shown in Table I, are typical for a mono corn starch orthophosphate ester of about 0.03 to 0.04 D.S. which has also been cross-linked with a limited amount of di-starch phosphate groups.

Moreover, the paste properties of this corn starch product and its characteristics as a food thickening agent, e.g., in the making of cherry pie fillings, closely resembled the very desirable properties of more costly starch products used for this and analogous applications. Such starch products include tapioca starch partially cross-linked by treatment with acetaldehyde, tapioca or waxy maize starches cross-linked by means of epichlorohydrin, and waxy maize starch cross-linked by treatment with phosphorus oxychloride.

EXAMPLE 13

*Production of starch phosphate by spray-drying starch and pyrophosphate*

Grain sorghum starch was stirred into water into which had been dissolved 0.5 lb. of sodium pyrophosphate for each 100 lb. of starch treated. The starch concentration in the slurry was approximately 10 percent. Equal quantities of tetrasodium pyrophosphate and disodium dihydrogen pyrophosphate were employed so as to adjust the pH level to 7.0. This slurry was then heated with stirring to approximately 210° F. and after it had become sufficiently fluid, it was fed to the atomizing nozzle (Spray Systems Company) of a parallel air flow, spray drier at an atomization pressure of 6,000 to 7,000 p.s.i. gauge. The inlet air temperature was 340° F. and the outlet temperature was 230° F. During this cycle, the starch was gelatinized and dried to a moisture content of approximately 5 percent.

The product from the spray dryer was a white powder which readily dispersed in cold water to form a relatively heavy bodied, homogeneous, smooth, colloidal system. This product showed characteristics which made it ideal as a food thickening agent, particularly in applications where a cold mixing starch product is desirable, as for example, in the preparation of pudding desserts where the pudding ingredients are not cooked but merely mixed with cold aqueous fluids. It was also noted that this starch product was substantially odorless and tasteless and remained so for extended periods of time when stored as a dry powder, in contrast to spray-dried or roll-dried cereal starches in general, such as untreated grain sorghum, corn and wheat, which have characteristic starchy flavors as made and which develop foreign, unpleasant odors and tastes on storage.

A 25 gram sample of this product was prepared for analysis by extraction with 250 ml. of 50 percent by volume aqueous methanol for 72 hours. The product was filtered by suction and washed on the filter with two, 100 ml. portions of 50 percent aqueous methanol. The cake was then extracted for 24 hours with 200 ml. of 50 percent aqueous methanol, filtered by suction and again washed on the filter with two, 100 ml. portions of 50 percent aqueous methanol. The product was then dehydrated by successive washes with absolute methanol during a period of 24 hours and air-dried.

Analysis for phosphorus by the Parr bomb method described previously showed 0.091 percent, which is equivalent to a phosphate content of 0.273 percent, dry basis.

EXAMPLE 14

*Production of starch phosphate by spray-drying a mixture of starch and pyrophosphate and additionally heating the product from the spray drier*

Starch was treated as in Example 13 and the dry powdered product from the spray drier at 5 percent moisture content, was fed as a thin layer to the belt of a continuous heater. Heating of the starch on the belt was accomplished by infra-red radiation. Movement of the starch on the belt was at such a rate, and the radiation was of such intensity that the starch product of Example 1 was heated to approximately 350° F. in 60 to 90 seconds and maintained at this temperature for 90 seconds. At the end of the belt, the starch product was cooled to room temperature in about 5 seconds.

During this heating, the moisture content of the starch product was reduced to the level of approximately 1 percent.

The product of this example formed a much more viscous colloidal mass when stirred into cold water than the product of Example 13. Moreover, the paste or sol was exceptionally homogeneous and smooth and proved to be a relatively efficient emulsification agent particularly for oil in water emulsions, such as for example, vegetable oil in dilute vinegar as in the preparation of salad dressings.

This starch phosphate was equally as free from odor and taste and was equally as stable in these respects on storage as the product of Example 13.

A sample of this starch phosphate was purified for analysis by the procedure given in Example 13. The content of phosphorus found was 0.102 percent, which is equivalent to a phosphate content of 0.306 percent, dry basis.

For comparison, grain sorghum starch, purified by aqueous methanol and absolute methanol extraction, in the manner used to purify the products of Examples 13 and 14, showed a phosphorus content of 0.031 percent, which is equivalent to a phosphate content of only 0.093 percent, dry basis.

From these comparisons it is obvious that some phosphorylation of the starch occurred during the spray-drying operation, under the conditions, temperature and time, employed in Example 13; 0.273–0.093=0.180 percent phosphate groups were introduced by these procedures, which it is believed accounts for the improved colloidal properties and the improved odor and taste of the product compared to untreated starch which is merely spray-dried or roll-dried.

During the secondary heating stage, employed in Example 14, phosphorylation by the added pyrophosphates was further increased, 0.306–0.093=0.213 percent phosphate groups, now having so been introduced into the starch product. It is believed that this further increase in phosphate ester groups introduced, accounts for the further improvement in colloidal properties of the product, particularly its improved stabilizing effect on oil in water emulsions and the excellent homogeneity of a cold water dispersion of the powdered product.

EXAMPLE 15

*Spray-drying and heating mixtures of corn starch and pyrophosphate*

Corn starch was wet blended with 0.5 percent pyrophosphate and the mixture spray-dried according to the procedures outlined in Example 1. The dried powdered product was additionally heated by the method given in Example 14. The final corn starch phosphate was quite comparable to the product obtained in Example 14. Compared to corn starch which had merely been spray-dried and heated, the product of Example 15 dispersed very much more readily in cold water, formed a much more homogeneous and viscous aqueous system, was a much more effective emulsifier for oil, particularly vegetable oil, in water and had substantially no taste or foreign odor even on extended storage.

EXAMPLE 16

*Higher ratio of pyrophosphate to starch*

The procedures given in Examples 13 and 14 were repeated using a ratio of 2.5 percent added tetrasodium pyrophosphate and 2.5 percent disodium dihydrogen pyrophosphate to starch. The final product formed a very viscous, homogeneous mass when mixed into cold water.

However, the product of this example had a slight characteristic phosphate salt taste which may be objectionable for certain food uses. Accordingly where the product is to be used as a thickener, gelling agent, emulsifier or suspension agent for food products, it is recommended that the total pyrophosphate addition be within the range of 0.50 to 1.00 percent to the weight of starch treated.

Other proportions of the sodium pyrophosphate to the acid sodium pyrophosphate have been employed, with resulting pH levels of the reaction mixture being different from the level employed in Example 13, which is pH 7.0. When higher proportions of the acid sodium pyrophosphate are used and when pH levels lower than about pH 6.0 are used, the end products are comparable to those obtained in Examples 13 and 14 except that cold water dispersions are of higher clarity and the viscosities are lower. This is due no doubt to the acid hydrolysis of the glucosidic linkages in the starch polymer, brought about by the acidity present at the temperatures employed. When higher proportions of the tetrasodium pyrophosphate were used, and when the pH value of the reaction mixture was higher than about pH 8.0, then the product developed a yellowish to brownish color, and a slight carmelized flavor, due quite likely to an atmospheric oxidation of the starch molecule at the alkalinity and the temperatures employed.

Accordingly, although starch may be phosphorylated with condensed phosphates, such as pyrophosphate and tripolyphosphate, using make-up pH values over a wide range of from about pH 4 to pH 11, and using a spray-drying technique illustrated in Example 13, preferably followed by an additional heating period, or using a conventional roll-drying operation followed by a heating period at appropriate temperatures and times, the preferred operating pH make-up range is between about 6.0 and 8.0, for reasons above outlined.

EXAMPLE 17

*Spray-drying and heating mixtures of starch and tripolyphosphate*

The procedures given in Examples 13 and 14 were repeated with the exception that instead of the added pyrophosphates, 1 percent of sodium tripolyphosphate was added to the starch and the slurry make-up was pH 8.0.

A starch phosphate resulted, quite comparable to the product obtained in Example 14.

EXAMPLE 18

*Prepared pudding mixture requiring no cooking*

A slurry was prepared in water at a total dry substance concentration of 11.2 percent, containing the following proportion of ingredients:

| | Percent |
|---|---|
| Starch phosphate as made in Example 8 | 60.0 |
| Sucrose | 35.2 |
| Ethavan flavor mix | 3.0 |
| Sodium chloride | 1.0 |
| Monostearin | 0.8 |
| | 100.0 |

The slurry was heated to gelatinize the starch and dry it to a powder, using a conventional type spray-drier operating at a drier temperature of 300° F.

The dry powder was then dry-blended with other ingredients in the following proportions by weight:

| | Percent |
|---|---|
| Spray dried, starch phosphate mix | 46.0 |
| Dextrose, powdered | 15.0 |
| Sucrose, powdered | 33.32 |
| Vanilla color mix | 1.0 |

| Ingredient | Percent |
|---|---|
| Imitation vanilla sugar | 4.0 |
| Sodium chloride | 0.5 |
| Rennin | 0.02 |
| Calcium acetate | 1.0 |
| Imitation butter | 0.16 |
| | 100.00 |

The mixture was ground to pass an 80 mesh screen. Then, approximately 3.85 ounces of the prepared pudding powder was stirred into a pint of cold milk (62° F.) and stirring was continued for 30 seconds. A homogeneous pudding mixture developed, which on standing 15 minutes exhibited the consistency, texture and flavor of the conventional, cooked starch pudding.

EXAMPLE 19

*Dessert composition for use with cold fluids*

A dry blend was prepared, using the product of Example 13 in the following formulation:

| Ingredients— | Dry weight |
|---|---|
| Starch phosphate (Example 13) | 18 |
| Powdered sucrose | 75 |
| Sodium chloride | 1 |
| Sodium pyrophosphate, decahydrate | 2 |
| Calcium acetate | 1 |
| Flavor and color blended on powdered dextrose | 3 |
| | 100 |

One hundred grams of this dry blend was stirred into 425 ml. of cold milk and the mixture was beaten with a hand beater for about 1 minute. The prepared pudding was poured into dishes and allowed to stand for 15 to 30 minutes. A very smooth, heavy bodied starch pudding of the blanc mange type developed, but without the taste characteristically imparted by cereal starches.

EXAMPLE 20

*Use of cross-linked starch phosphate in the production of canned cherry pie fillings*

Canned cherry pie fillings were prepared as follows: 3.5 lbs. of cross-linked starch phosphate, as prepared in Example 12, was stirred into 16 lbs. of water to make a slurry.

This slurry was added to a batch of cooked cherries prepared as indicated below.

A mix was made up of the following ingredients:

| | |
|---|---|
| Drained cherries (frozen and thawed) (5 parts cherries, 1 part sucrose), total lbs. | 64 |
| Cherry juice (5 parts juice, 1 part sucrose), total lbs. | 21 |
| Sucrose lbs. | 8 |
| Corn sirup lbs. | 4 |
| Artificial color oz. | 0.15 |

The mix was stirred slowly while cooking to 190° F. At this time the starch phosphate slurry was added and the temperature was raised to and held at 196° F. for 10 minutes.

Thereupon the hot prepared pie fillings were poured into cans and sealed. The cans were then immersed in boiling water for 10 minutes and cooled to room temperature.

Cherry pie fillings were similarly prepared using untreated corn starch.

At periodic intervals, over several weeks' time, cans of each of the two pie fillings were opened. Fillings made containing starch phosphate remained fluid but of satisfactory consistency and the liquid portion was clear. Fillings made of untreated corn starch were fluid as made, but after about two days, set to opaque gel-like mass.

Cherry pies were made and baked from both types of fillings. The cherry pie fillings made from the starch phosphate were fluid, of a very desirable consistency, clear and of a very attractive appearance. Those made from untreated corn starch were opaque, whittish in appearance and gel-like in consistency.

EXAMPLE 21

*Pie filling mix for use with cold fluids*

A dry powdered blend was prepared by intimately mixing the following ingredients:

| Ingredients— | Dry weight, percent |
|---|---|
| Starch phosphate (Example 14) | 10 |
| Sucrose, powdered | 30 |
| Dextrose, powdered | 29 |
| Cocoa | 13 |
| Vegetable shortening | 8 |
| Evaporated corn syrup solids | 6 |
| Dry milk solids | 2.5 |
| Sodium chloride | 1.0 |
| Flavor (1% ethyl vanillin on 99% dextrose) | 0.5 |
| | 100.0 |

Six ounces of this preparation was well mixed with 160 ml. of milk. A very smooth, heavy bodied cream pie filling developed which when placed in baked pie crusts was ready for eating without cooking. The flavor of the chocolate cream pie was free of taste associated with cereal starches.

EXAMPLE 22

*Powdered salad dressing preparation*

An intimate mixture was prepared in dry form from the following ingredients:

| Ingredients— | Dry weight, percent |
|---|---|
| Starch phosphate (Example 14) | 26.5 |
| Sucrose | 45.0 |
| Dextrose | 12.0 |
| Sodium chloride | 9.0 |
| Egg white solids | 4.0 |
| Powdered mustard | 3.4 |
| Paprika and other flavors | 0.1 |
| | 100.0 |

Two ounces of the above powdered mixture was used to emulsify 160 ml. of vegetable oil in 60 ml. of vinegar plus 120 ml. of water, using a power driven kitchen mixer. A very smooth, heavy bodied, stable salad dressing developed of the appearance of mayonnaise, which had no characteristic cereal starch flavor.

When a spray-dried product prepared either from untreated grain sorghum or corn starches was used in the formulations given in Examples 19, 21 and 22 in place of the starch phosphates, in each case products resulted which had unacceptably thin body, were poor in texture and developed characteristic cereal starch flavor.

EXAMPLE 23

*Starch phosphate in cream style corn*

In canning sweet corn (cream style), field tests have shown that starch phosphate prepared in accordance with Example 4 gave the same consistency to cream style corn as twice the weight of untreated corn starch. Moreover, the consistency was smoother with starch phosphate since it was superior in preventing curdling of the sweet corn protein during the cooking and canning operation.

EXAMPLE 24

*Use of starch phosphate to prevent water-loss in oil well drilling muds*

Starch phosphate, as made in Example 4, was gelatinized in 10 percent aqueous sodium chloride and added to a conventional drilling mud in a proportion of 3.5 lbs.

starch phosphate per barrel of mud. The mass was agitated with a high speed mixer for 5 minutes at room temperature. Water loss was determined in a standard American Petroleum Institute wall building tester filter press, applying a pressure of 100 p.s.i. The filtrate was collected over a 14 minutes' interval and the number of milliliters collected between one minute and 14 minutes was noted and this value, for comparative purposes was multiplied by two. Portions of the prepared mud mixture were allowed to stand at room temperature for 24 hours and at 150° F. for 24 hours. The water loss values are shown below.

Two commercial starch products sold as drilling mud adjuncts under the trademarks "Impermex" and "Mylogel" were tested at the same concentration using the same drilling mud with results as follows:

COMPARATIVE WATER-LOSS VALUES

| Test | Starch Phosphate | "Impermex" | "Mylogel" |
| --- | --- | --- | --- |
| Initial | 7.8 | 13.0 | 14.0 |
| 24 Hrs. at room temperature | 7.2 | 11.8 | 12.0 |
| 24 Hrs. at 150° F | 6.0 | 11.6 | 12.2 |

These results show that water-loss using starch phosphate was almost 100 percent more when either of the commerial starches was used.

EXAMPLE 25

*Use of starch phosphate in beater size*

The following data will show that corn starch phosphates produce an unanticipated result in increasing the Mullen test when added at the rate of 2 percent, based on weight of pulp to beater size.

| Starch | Mullen Test, lb./sq. in. (427# Sheet Basis) | Percent Increase in Mullen Test Over Blank |
| --- | --- | --- |
| Blank (no starch) | 13.1 | |
| Gelatinized potato starch ¹ | 24.4 | 86.3 |
| Starch phosphate | 29.9 | 128.5 |

¹ Sold under trademark "Tufjel."

This application is a continuation-in-part of our application Serial No. 388,914, filed October 28, 1953, now abandoned.

We claim:

1. A process for making starch orthophosphate esters which comprises heating a starch product containing not more than about 20 percent of moisture in contact with about 0.5 to about 10 percent, based on the dry weight of the starch product, of an alkali metal inorganic phosphate salt at a temperature between about 100° C. and about 160° C. for a time to effect the desired degree of esterification; said heating being carried out while permitting evaporation of water; the pH during the heat treatment being within the range of 4 to 11.5; said phosphate salt being from the group consisting of metaphosphates, polymetaphosphates, pyrophosphates, tripolyphosphates and mixtures thereof.

2. Process according to claim 1 wherein said phosphate salts are sodium salts.

3. A process for making starch phosphate esters which comprises heating a starch product containing about 5 to about 20 percent of moisture in contact with about 0.5 to about 10 percent, based on the dry weight of the starch product, of an alkali metal inorganic phosphate salt at a temperature between about 100° C. and about 160° C. while maintaining the starch in unswollen granule state for a time sufficient to effect the desired degree of esterification; said heating being carried out while permitting evaporation of water; the pH during the heat treatment being within the range of 4 and 11.5; said phosphate salt being from the group consisting of metaphosphates, polymetaphosphates, pyrophosphates, tripolyphosphates and mixtures thereof.

4. A process for making a starch derivative which is predominately a mono-starch phosphate which comprises heating starch containing about 5 to about 20 percent of moisture in contact with about 0.5 to about 10 percent, based on the dry weight of the starch, of an alkali metal inorganic phosphate salt at a temperature between about 100° C. and about 160° C. for a time to effect the desired degreee of esterification; said heating being carried out while permitting evaporation of water; said phosphate salt being selected from the group consisting of metaphosphates, polymetaphosphates, pyrophosphates, tripolyphosphates and mixtures thereof; the pH during the heat treatment when metaphosphates and said mixtures are used being about 4 to 5 and the pH when the remaining salts in the group are used being about 7 to about 9.

5. A process for making a starch derivative which is predominately a mono-starch phosphate which comprises heating starch containing about 5 to about 20 percent of moisture in contact with about 0.5 to about 10 percent, based on the dry weight of the starch, of an alkali metal inorganic phosphate salt at a temperature between about 100° C. and about 160° C. while maintaining the starch in unswollen granular state for a time to effect the desired degree of esterification; said heating being carried out while permitting evaporation of water; said phosphate salt being selected from the group consisting of metaphosphates, polymetaphosphates, pyrophosphates, tripolyphosphates and mixtures thereof; the pH during the heat treatment when metaphosphates and said mixtures are used being about 4 to 5 and the pH when the remaining salts in the group are used being about 7 to about 9.

6. A process for making a starch derivative which is predominately a di-starch phosphate which comprises heating starch containing about 5 to about 20 percent of moisture in contact with about 0.5 to about 10 percent, based on the dry weight of the starch, of an alkali metal inorganic phosphate salt at a temperature between about 100° C. and about 160° C. for a time to effect the desired degree of esterification; said heating being carried out while permitting evaporation of water; said phosphate salt being selected from the group consisting of metaphosphates and polymetaphosphates, the pH during the heat treatment being about 5 to about 11.5.

7. A process for making mono-starch phosphate containing a small amount of di-starch phosphate groups which comprises heating starch containing not more than about 20 percent of moisture in contact with about 0.5 to about 10 percent, based on the dry weight of the starch, of an alkali metal inorganic phosphate salt at a temperature between about 100° C. and about 160° C. while maintaining the starch in unswollen granule state for a time to effect the desired degree of esterification; said heating being carried out while permitting evaporation of water; said phosphate salt consisting of a mixture of sodium tripolyphosphate and sodium metaphosphate, the former being present in an amount greater than the latter; the pH of the starch undergoing heat treatment being about 8.

8. A process for the preparation of starch orthophosphate esters which comprises heating with instantaneous removal of water, a mixture of a starch product, water, and an alkali metal inorganic phosphate salt at starch temperatures of about 100° C. to about 175° C.; the pH of said mixture during the heat treatment being within the range of about 4 and about 11.5; said phosphate salt being selected from the group consisting of metaphosphates, polymetaphosphates, pyrophosphates, tripolyphosphates and mixtures thereof and being present in an amount within the range of about 0.5 to about 10 percent of the starch, dry basis.

9. Process according to claim 8 wherein said phosphate salt consists of 0.25 to 0.5 percent of each of tetrasodium pyrophosphate and disodium dihydrogen pyrophosphate, based on the weight of the starch.

10. Process according to claim 3 wherein the resultant starch phosphate esters are washed with water and dried.

11. Process according to claim 5 wherein the resultant starch phosphate esters are washed with water and dried.

12. Process according to claim 7 wherein the resultant starch phosphate esters are washed with water and dried.

13. A process for producing a mixed mono- and di-starch phosphate ester which comprises heating a starch product containing about 5 to about 20 percent of moisture in contact with about 0.5 to about 10 percent, based on the dry weight of the starch product, of a mixture consisting of the sodium salt of a phosphate from the group consisting of pyrophosphates and tripolyphosphates and the sodium salt of a phosphate from the group consisting of metaphosphates and polymetaphosphates, at a temperature between about 100° C. and about 160° C. while maintaining the starch in unswollen granule state for a time to effect the desired degree of esterification; said heating being carried out while permitting evaporation of water; the pH during the heat treatment being within the range of about 7 to 11.

14. A starch derivative unswollen starch granules containing both mono-starch and di-starch orthophosphate groups, the mono group being predominant, said derivative being insoluble in cold water and gelatinizable by heating in water.

15. A starch derivative, monostarch orthophosphate esters in the unswollen granule state, being insoluble in cold water and gelatinizable by heating in water, the starch in said mono-starch orthophosphate esters being a member selected from the group consisting of corn starch, wheat starch and grain sorghum starch.

References Cited in the file of this patent

UNITED STATES PATENTS

| | | |
|---|---|---|
| 2,252,479 | Beyer | Aug. 12, 1941 |
| 2,282,818 | Musher | May 12, 1942 |
| 2,575,352 | Lohmar | Nov. 20, 1951 |
| 2,590,912 | Yarber | Apr. 1, 1952 |
| 2,727,002 | Rowe | Dec. 13, 1955 |
| 2,818,343 | Toulmin | Dec. 31, 1957 |

FOREIGN PATENTS

| | | |
|---|---|---|
| 70,237 | Switzerland | May 8, 1913 |

UNITED STATES PATENT OFFICE

CERTIFICATE OF CORRECTION

Patent No. 2,884,413  April 28, 1959

Ralph W. Kerr et al

It is hereby certified that error appears in the printed specification of the above numbered patent requiring correction and that the said Letters Patent should read as corrected below.

Column 10, Table II, under the heading "24 hrs. at 25° C." for the numeral "31" read -- 41 --; column 13, lines 3 and 57, for "Example 1", in each occurrence, read -- Example 13 --; column 15, line 22, Example 19, for "Dry weight" read -- Dry weight, percent --.

Signed and sealed this 10th day of November 1959.

(SEAL)
Attest:

KARL H. AXLINE
Attesting Officer

ROBERT C. WATSON
Commissioner of Patents